June 7, 1960 J. C. WISE 2,939,276
CONTROL SYSTEM FOR VARIABLE AREA SUPERSONIC DIFFUSER
Filed Feb. 24, 1954 4 Sheets-Sheet 1

JAMES C. WISE
INVENTOR.

BY R. E. Geauque
ATTORNEY

United States Patent Office 2,939,276
Patented June 7, 1960

2,939,276

CONTROL SYSTEM FOR VARIABLE AREA SUPERSONIC DIFFUSER

James C. Wise, Woodland Hills, Calif., assignor to The Marquardt Corporation, a corporation of California Filed Feb. 24, 1954, Ser. No. 412,231

14 Claims. (Cl. 60—35.6)

This invention relates to a control for a variable area supersonic diffuser and more particularly to a control which will maintain critical operation of the diffuser during flight at supersonic Mach numbers where the normal shock is in the vicinity of the diffuser lip. The invention is applicable to air breathing engines, such as turbojets, with or without afterburner and/or variable exit nozzles, and ramjets, operating over a wide range of flight speeds. In operation of the invention, the air mass flow and ram pressure recovery into the engine is varied to match the air consumption of the engine without the possibility of unstable diffuser operation and to assure the highest practical ram pressure recovery.

In previous controls, the conical nose section of the diffuser has been driven by electrical motors to vary the inlet area of the diffuser to maintain normal shock at the diffuser lip and such systems require complicated electronic and electrical controls for sensing the presence of normal shock and separately setting up an inlet area schedule. In the present control system, greater simplicity is achieved since for all subsonic and supersonic flight speeds, the ratio of two control pressures are utilized to schedule the diffuser inlet area in proportion to the changes in speed and override that schedule whenever there is a possibility of diffuser instability due to the normal shock moving forward of the diffuser lip and out onto the conical nose section. By utilizing such a pressure ratio, this scheduling action can be accomplished with fewer moving parts than in previous systems. The words "schedule" and "scheduling" as used herein denote a prescribed relationship between an input variable and an output variable.

The several modifications of the invention herein disclosed incorporate a device for sensing the ratio of two pressures, such as disclosed in U.S. Patent No. 2,864,393, granted December 16, 1958 to John A. Drake and usually referred to as a "ratiometer." Such a device is capable of measuring the ratio between the two control pressures which ratio is used for scheduling the inlet area and various types of servo systems, such as hydraulic, electrical and pneumatic, can be controlled by the device for scheduling purposes. The hydraulic and pneumatic servo systems are not affected by heat, vibration and other severe environments to the extent that the electronic or electrical systems of prior control systems are affected. In the case of the pneumatic servo system under control of a ratiometer, the operating pressure can be derived from the diffuser itself and therefore the system is not dependent upon the performance of other power systems in the aircraft and failure of these other systems will not affect the control of the diffuser. The speed of response of all modifications to changes in speed of the mounting craft or to movements of normal shock is easily adjustable to be compatible with the dynamic requirements of the engine and its controls.

It is therefore an object of the present invention to provide a control system for a variable area supersonic diffuser which schedules the inlet area in accordance with the ratio of static pressure at the diffuser lip ($P_1$) to free stream static pressure ($P_0$).

Another object of the invention is the provision of a control system which controls the inlet area of the diffuser at Mach numbers below about 1.4 in accordance with changes in Mach number by utilizing a pressure ratio for control purposes which is a unique function of Mach number.

A further object of the invention is to provide a control system which senses the change in static pressure at the diffuser lip as normal shock moves past the lip and which utilizes this pressure change in order to schedule the diffuser inlet area in a manner that normal shock is held at the diffuser lip and critical operation maintained.

A still further object of the invention is to provide a control system utilizing two control pressures to continually schedule the inlet area of the diffuser in such a manner that the highest practical ram pressure recovery is obtained.

Another object of the invention is the provision of a pressure control system for a supersonic diffuser which, in connection with various types of servo systems, is capable of controlling the inlet area of the diffuser without the necessity of utilizing heavy, complicated electrical control equipment.

A further object of the invention is to arbitrarily schedule the inlet area of a supersonic diffuser, when operating at supersonic Mach numbers at which the normal shock is in the vicinity of the diffuser lip so that the normal shock is continually positioned at the diffuser lip to provide critical operation of the diffuser.

These and other objects of the invention not specifically set forth above will become readily apparent from the accompanying description and drawings in which.

For a given selected schedule of inlet area variations with aircraft forward speed, the same schedule can be based on the ratio of static pressure at the diffuser lip ($P_1$) to free stream static pressure ($P_0$) since this ratio is a unique function of Mach number up to the point where normal shock reaches the diffuser lip. Referring to the curve of $P_1/P_0$ vs. Mach number shown in Figure 2, portion A of the curve shows this unique function and since, in this region, the requirement of inlet area for any given engine can be scheduled with Mach number, the inlet area can also be controlled by the ratio $P_1/P_0$ which is a unique function of Mach number.

Figure 1:
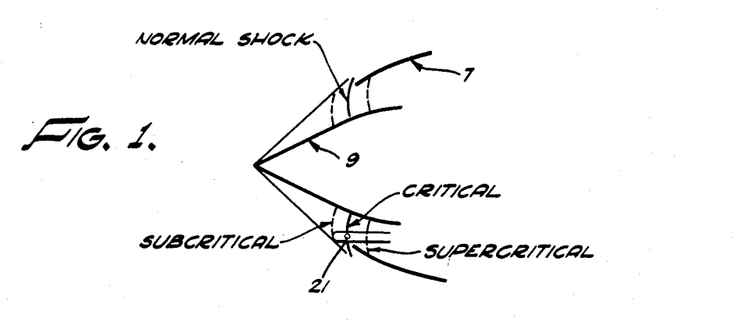
Figure 1 is a diagrammatic view of the diffuser inlet showing the positions of normal shock during subcritical, critical and supercritical operation.

However, at high Mach numbers (above about 1.4), the ratio $P_1/P_0$ is a double valued function of Mach number depending upon the location of normal shock with respect to the $P_1$ probe. Referring to Figure 1, the conical nose of a supersonic diffuser is shown with both the normal shock wave and the $P_1$ static pressure probe located at the diffuser lip so that the diffuser has critical operation with highest possible ram pressure recovery behind the diffuser. When the normal shock moves forward on the nose, subcritical operation takes place and when the shock moves rearwardly, supercritical operation results. Both subcritical operation and supercritical operation are undesirable since the corresponding ram pressure recovery efficiency is lower in both cases than for critical operation of the diffuser and considerable air pulsations and vibration also accompanies subcritical operation.

Figure 2:
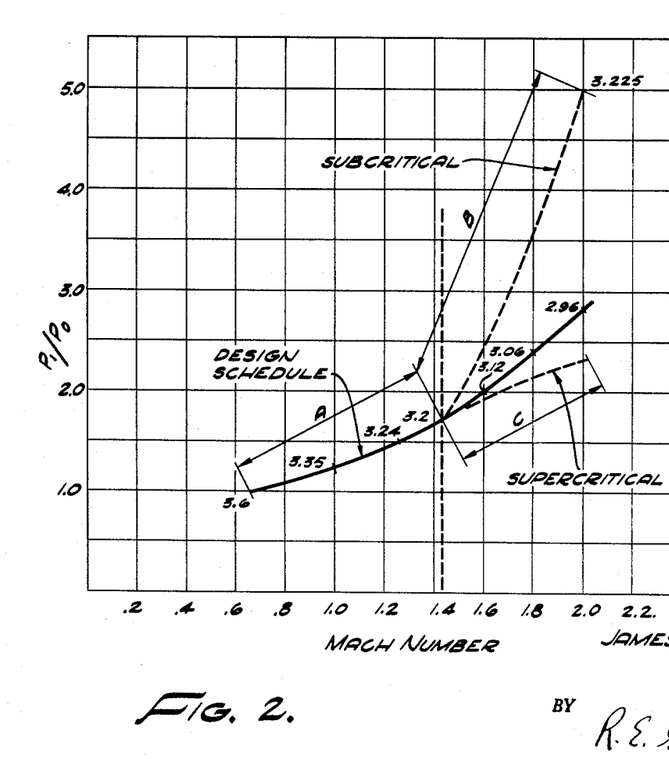
Figure 2 is a graphical representation of the variation of $P_1/P_0$ with Mach number and showing the double valued function at high Mach numbers.

The double valued function of $P_1/P_0$ is indicated by portions B and C of Figure 2 for subcritical and supercritical operation, respectively, resulting when the Mach number is high enough for normal shock to reach the diffuser lip. In other words, if the schedule for the inlet area calls for too large an area at these high Mach numbers, the diffuser will operate subcritically and $P_1/P_0$ will vary with Mach number along portion B. On the other hand, if the schedule of inlet area calls for too small an area, the diffuser will have supercritical operation and $P_1/P_0$ will vary with Mach number along portion C of the curve. It is therefore apparent that the value of $P_1/P_0$ for critical operation lies between the values of this ratio for subcritical and supercritical operation, respectively, and that it is possible to arbitrarily schedule inlet area with $P_1/P_0$ so that normal shock will be positioned at the diffuser lip to maintain continual critical operation.

Figure 3:
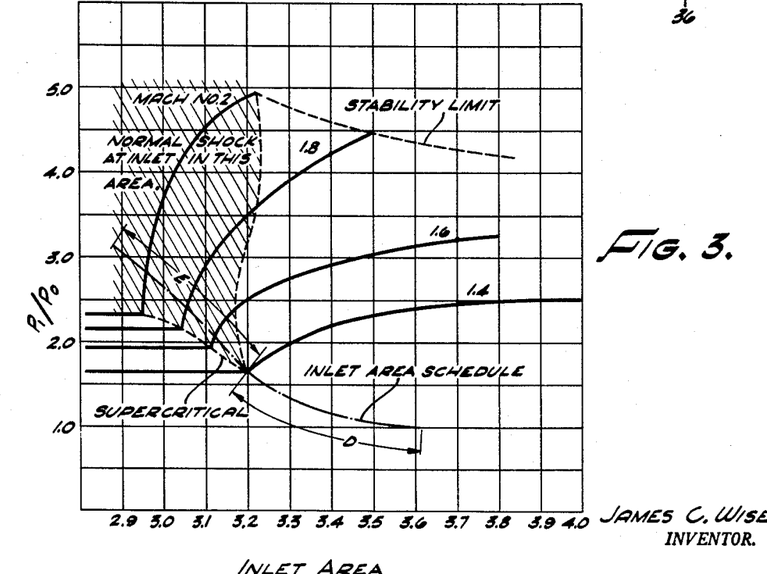
Figure 3 is a graphical representation of the variation of $P_1/P_0$ with diffuser inlet area for various Mach numbers.

Such an arbitrary schedule is illustrated in Figure 3, where $P_1/P_0$ is plotted against diffuser inlet area for a number of flight Mach numbers. The portion D of the curve corresponds to portion A of Figure 2 and since $P_1/P_0$ is a unique function of Mach number in the range below Mach number of about 1.4, it is apparent that the inlet area can be scheduled in accordance with $P_1/P_0$ as well as with Mach number. However, at Mach numbers at about 1.4 and above, the value of $P_1/P_0$ rises rapidly as the normal shock moves forwardly past the diffuser lip and this rise in $P_1/P_0$ at any given Mach number occurs over a small change in inlet area. The existence of a steep, yet not vertical slope of the $P_1/P_0$ vs. inlet area curve during the passage of normal shock past the diffuser lip makes it possible to select an arbitrary schedule for $P_1/P_0$ vs. inlet area, as indicated by portion E of Figure 3 and it will be noted that the portion E lies within the shaded area of Figure 3 corresponding to the condition of critical operation with the normal shock at the diffuser lip. Since a change in inlet area will move the normal shock along the diffuser and since this movement of normal shock causes a change in the ratio $P_1/P_0$, this ratio can be utilized to schedule the inlet area in the desired manner and normal shock will be automatically positioned at the $P_1$ probe. If for any reason the shock is in front of the probe, $P_1/P_0$ is high causing the conical spike to close the area until $P_1/P_0$ drops to the value causing equilibrium and if the shock is behind the probe, the reverse occurs. The numerical values applied to Figures 2 and 3 are for one diffuser design and, of course, when the geometry of the diffuser is changed, these values will change but the curves for any geometry will still have the same characteristics.

While the curve of Figure 3 shows the manner in which $P_1/P_0$ varies for each flight Mach number, it is apparent that if the inlet area remains constant and the Mach number changes, a change in $P_1/P_0$ will also result to cause the inlet area to be adjusted so that the area will correspond to that called for by the schedule position E at the new Mach number. Also, if the flight Mach number remains constant, the normal shock can be moved past the diffuser lip by changes in mass air flow through the diffuser resulting from changes in engine requirement. Such change in position of normal shock will act in the same manner as a change in Mach number to change the value of $P_1/P_0$ and of course, this change will result in adjusting the inlet area to maintain the value of $P_1/P_0$ called for by the schedule. It is understood that the desired schedule is built into the ratiometer by contouring the nozzle of the ratiometer or by introducing a cam in the follow-up linkage so that the inlet area will vary in the desired manner with changes in the ratio $P_1/P_0$.

Figure 4:
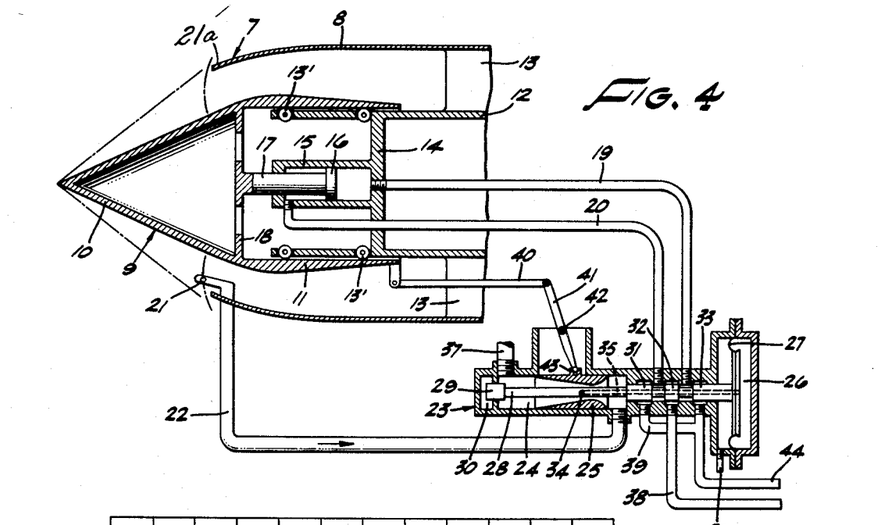
Figure 4 is a diagrammatic view of the pneumatic-hydraulic form of the invention wherein the control pressures regulate the movement of a hydraulic valve in order to position the diffuser spike.

Referring to the form of the invention shown in Figure 4, the supersonic diffuser 7 is comprised of the engine cowling 8 and a movable diffuser spike 9 having a conical nose section 10 and a circular base portion 11. A circular body member 12 is supported within the cowling 8 by means of struts 13 and the remaining components of the engine are positioned behind member 12. One end of member 12 projects into the open base portion 11 and carries a number of rollers 13' for slidably supporting the diffuser spike. A partition 14 is positioned within member 12 and supports a cylinder 15 which contains a piston 16 rigidly connected by rod 17 to a partition 18 of nose section 10. Hydraulic lines 19 and 20 connect with cylinder 15 on opposite sides of piston 16 so that the piston can be reciprocated in order to move the diffuser spike and vary the inlet area in a manner presently to be described.

A static pressure probe 21 is positioned at the lip 21a of the diffuser and supplies the static pressure at the diffuser lip $P_1$ to the passage 22. The ratiometer device is formed of a casing 23 having a cavity 24 for slidably receiving a converging-diverging nozzle 25 and a cavity 26 for diaphragm 27. Intermediate these two cavities, the casing 23 forms a valve structure which regulates the pressure supply to lines 19 and 20. A pick-up member 28 is located centrally of casing 23 and has an enlarged end section 29 slidably supported within an opening in partition 30 of casing 23. The other end of member 28 is secured to the rigid central portion of diaphragm 27 and this other end of member 28 has enlarged valve portions 31, 32 and 33 which are slidable within the valve structure formed by casing 23. The portion of member 28 within nozzle 25 has a pressure pick-up opening 34 which is connected to one side of diaphragm 27 by a central passage 35 extending through the valve portions. The other side of diaphragm 27 is connected to free stream static pressure ($P_0$) through a passage 36 and it is apparent that movement of diaphragm 27 will change the position of opening 34 with respect to the throat of nozzle 25 and will also move the valve portions 31, 32 and 33.

The passage 22 connects the pressure $P_1$ with cavity 24 at a position ahead of the nozzle 25 and the nozzle exhaust to pressure $P_0$ through passage 37, connected to cavity 24 at a position behind the nozzle. The difference between pressures $P_1$ and $P_0$ is not sufficient to cause sonic velocity flow through the throat of nozzle 25 until the flight speed reaches a Mach number of about 1.5. At speeds below this Mach number, the opening 34 will be scheduled to move within the entrance portion of the nozzle located to the right of the throat and the value $Px$ sensed by opening 34 will decrease as the opening 34 moves to the left in Figure 4 and toward the throat. This variation in $Px$ results since $Px$ is a fraction of pressure $P_1$ as determined by the ratio of the area of the nozzle at the position of the opening 34 to the area of the throat. However, as the Mach number exceeds the value of about 1.5, the difference between pressures $P_1$ and $P_0$ is sufficient to maintain sonic velocity flow at the throat of nozzle 25 and the inlet area schedule requires that the opening 34 move within the exit portion of the nozzle. With sonic flow at the throat, the pressure $P_x$ at opening 34 will continue to decrease as the opening 34 moves to the left in Figure 4 and away from the throat of the nozzle since the pressure $P_x$ will now be a fraction of pressure $P_1$ as determined by the ratio of throat area to the area of the nozzle at the position of the opening 34 in the exit portion of the nozzle. This characteristic of the nozzle is fully explained in U.S. Patent No. 2,864,393 to John A. Drake. Thus, as opening 34 moves from right to left within the nozzle (as viewed in Figure 4) it will sense a continually decreasing fraction of pressure $P_1$ and passage 35 will supply a pressure $P_x$ to one side of diaphragm 27 which is a function of the position of opening 34 along the nozzle. At some position of the opening, the pressure $P_x$ will just balance the pressure $P_0$ so that the diaphragm will move the opening 34 in the required direction to reach this position.

Referring to the operation of the invention in accordance with the selected schedule, an increase in pressure $P_1$ at probe 21 will result in an increase in $P_x$ and in the ratio $P_1/P_0$ which will cause the diaphragm 27 to move opening 34 to the left in nozzle 25. This movement will cause valve portion 32 to connect high pressure line 38 with passage 19 and will cause valve portion 31 to connect passage 20 with low pressure line 39. The high pressure will move piston 16 in a direction to cause the spike 9 to reduce the inlet area to a value as determined by the schedule of $P_1/P_0$ vs. inlet area. A follow-up linkage is connected between the spike and the nozzle and is comprised of arms 40 and 41. The arm 41 is pivotally mounted on casing 23 by a pin 42 and one end of this arm rides in a slot formed by projection 43 on the nozzle so that pivotal movement of arm 41 changes the position of nozzle 25 relative to opening 34. The arm 40 is connected between the spike and the other end of arm 41 so that movement of the spike will result in movement of the nozzle. Thus, the forward movement of the spike will move the nozzle 25 in a direction to reduce the measured pressure $P_x$ until this value becomes equal to $P_0$ at which time the valve portions will become centered at the null position and no further movement of the spike will result.

In the event the pressure $P_1$ decreases, the corresponding decrease in $P_1/P_0$ and $P_x$ will cause diaphragm 27 to move opening 34 to the right in nozzle 25 and such movement will cause valve portion 32 to connect passage 20 with high pressure line 38 while valve portion 33 will connect passage 19 to low pressure line 44. This will result in movement of the spike to open the inlet area, which movement will move nozzle 25 in a direction to increase the pressure $P_x$ until it again balances the pressure $P_0$. When this balance occurs, the valve portions will again be centered and the inlet area will correspond to the larger area called for by the lower value of $P_1/P_0$ in accordance with the selected schedule. The invention will operate in the same manner over both portions D and E of the schedule but the spike will position opening 34 either ahead of or behind the nozzle throat depending upon whether or not there is sonic velocity flow at the throat.

From the above description, it is apparent that the spike is positioned as a function of the ratio $P_1/P_0$ which, below a Mach number of about 1.4, is a function of Mach number. Thus, within the portion D of Figure 3, the initial selected requirement of a spike position as a function of Mach number is supplied. The portion E of Figure 3 shows the desired schedule of $P_1/P_0$ vs. inlet area in the region where critical operation is desired at speed of about Mach number 1.4 and above. At any constant flight speed, the normal shock will move back and forth past the diffuser lip when the engine airflow is increased or decreased. If the normal shock should move to a position in front of the probe 21, the ratio $P_1/P_0$ would be high causing the valve portions to move the spike in a direction to reduce the inlet area until $P_1/P_0$ drops to the value called for by portion E of the schedule. On the other hand, if the normal shock should move to a position in back of the probe 21, the ratio of $P_1/P_0$ would be low causing the valve portions to move the spike in a direction to increase the inlet area until $P_1/P_0$ reaches a value called for by the schedule. Also, such changes in normal shock position resulting from a change in flight speed will be corrected for in the same manner. Thus, by locating the probe at the engine inlet, the system provides a method of automatically maintaining critical diffuser operation.

It is understood that the selected schedule is obtained by contouring the DeLaval nozzle so that the nozzle area varies with respect to the throat area in a manner such that the spike position, corresponding to the position of the nozzle for each value of $P_1/P_0$ will give the desired inlet area. While only a single static hole is illustrated, manifolding of several probes could be utilized to correct for pressure variations caused by changes in the angle of attack. Also, if necessary, the probe configuration would be varied to change the slope of the curves in Figure 3. The time constant of the hydraulic servo system can be varied in any well known manner to achieve maximum possible response compatible with engine-diffuser stability.

Figures 5, 6:
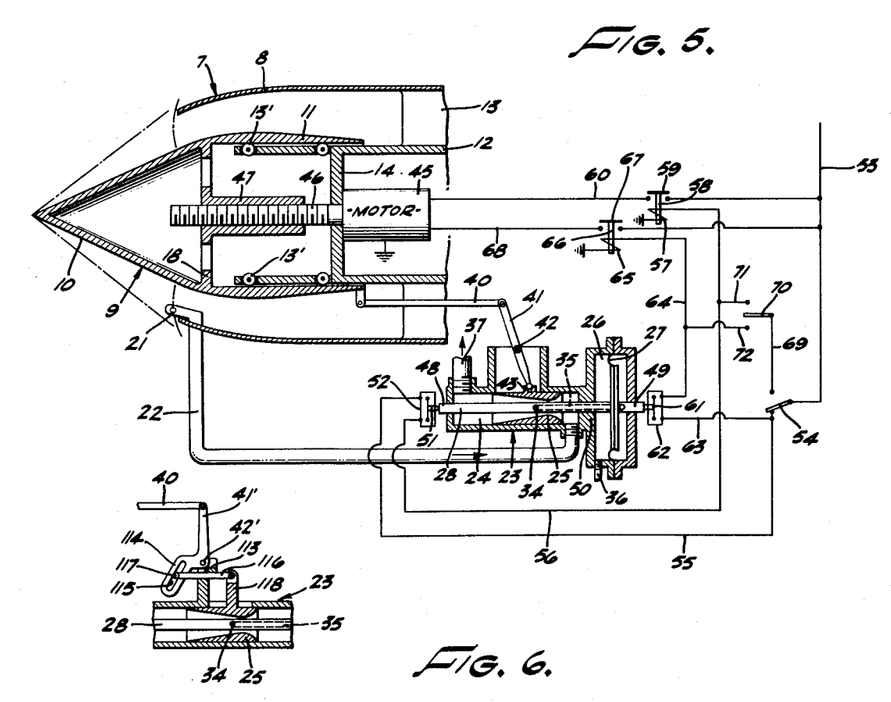
Figure 5 is a diagrammatic view of the pneumatic-electrical form of the invention wherein the control pressures regulate an electric motor to position the diffuser spike.
Figure 6 is a diagrammatic view of a modified form of follow-up linkage which is utilized in connection with a nozzle of fixed contour.

A modification of the invention is illustrated in Figure 5 wherein an electrical servo system is illustrated for positioning the diffuser spike and like reference numerals indicate like parts as in the previous embodiment. The spike 9 of diffuser 7 has a conical nose section 10 and a circular base portion 11 which is supported by rollers 13' carried by one end of member 12. The partition 14 of member 12 supports an electric motor 45 which drives a screw 46 threaded through extension 47 of partition 18. Movement of the screw 46 in reverse directions by motor 45 will move spike 8 along member 12 and thereby vary the inlet area of the diffuser.

The static pressure probe 21 is positioned at the lip of the diffuser and supplies the static pressure ($P_1$) at the diffuser lip to the passage 22. The ratiometer device of this modification is formed of a casing 23 having a cavity 24 for slidably receiving the converging-diverging nozzle 25 and a cavity 26 for diaphragm 27. A pick-up member 28 is located centrally of casing 23 and has an end 48 slidably supported by an opening in casing 23, while the other end 49 extends through cavity 26 and is likewise slidably supported by an opening in casing 23. The rigid central portion of diaphragm 27 is secured to member 28 adjacent end 49 and the member is also supported intermediate its ends in an opening in partition 50. The portion of member 28 within nozzle 25 has a pressure pick-up opening 34 connected to one side of diaphragm 27 by a central passage 35 while the other side of the diaphragm is connected to free stream static pressure ($P_0$) through a passage 36 and it is apparent that movement of diaphragm 27 will change the position of opening 34 with respect to the throat of nozzle 25.

Passage 22 connects the pressure ($P_1$) with cavity 24 at a position ahead of nozzle 25 and the nozzle exhaust to pressure ($P_0$) through passage 37, connected to cavity 24 at a position behind the nozzle. As discussed in connection with the previous embodiment, the opening 34 in moving from left to right within the nozzle (as viewed in Figure 5) will sense a continually decreasing fraction of pressure $P_1$ and passage 35 will supply a pressure $P_x$ to one side of diaphragm 27 which is some fraction of pressure $P_1$ depending upon the position of opening 34 along the nozzle. A follow-up linkage is connected between the spike 9 and nozzle 25 and is comprised of arms 40 and 41. The arm 41 is pivotally mounted on casing 23 by a pin 42 and one end of this arm rides in a slot formed by projection 43 on the nozzle so that pivotal movement of arm 41 changes the position of nozzle 25 relative to opening 34. The arm 40 is connected between the spike and the other end of the arm 41 so that movement of the spike will result in movement of the nozzle.

The end 48 of member 28 bears against pin 51 carrying contacts of switch 52 which is normally open when diaphragm 27 is centered in null position. One side of switch 52 is connected to a power supply line 53 through manual switch 54 and line 55 while the other side of the switch is connected to ground through line 56 and solenoid winding 57. The armature 58 of the solenoid carries a normally open switch arm 59 which is closed upon energization of winding 57 to complete a circuit from line 53 through line 60 to motor 45 and thereby operate the motor in one direction to reduce the inlet area of the diffuser. The end 49 of member 28 bears against pin 61 carrying contacts of switch 62 which is also normally open when diaphragm 27 is centered in null position. One side of switch 62 is connected to power supply line 53 through switch 54 and line 63 while the other side is connected to ground through line 64 and solenoid winding 65. The armature 66 carries a normally open switch arm 67 which is closed upon energization of winding 65 to complete a circuit from line 53 through line 68 to motor 45 and thereby operate the motor in the reverse direction to increase the inlet area of the diffuser. If it is desired to manually operate the motor 45 to position the spike, switch 54 is moved into contact with line 69 thereby disconnecting switches 52 and 63 from line 53. Line 69 connects with manual switch 70 which can be selectively moved into contact with line 71 to energize solenoid winding 57 or can be moved into contact with line 72 to selectively energize solenoid winding 65.

In operation of this modification, an increase in pressure $P_1$ at static probe 21 will result in an increase in $P_x$ and in the ratio $P_1/P_0$ which will cause diaphragm 27 to move opening 34 to the left in nozzle 25. This movement will cause end 48 to close switch 52 so that motor 45 will move spike 9 forwardly to reduce the inlet area to a value as determined by the schedule of $P_1/P_0$. At the same time, the follow-up links 40 and 41 will move the nozzle to the right until the pressure $P_x$ sensed by opening 34 is reduced to a value that balances pressure $P_0$ on the other side of the diaphragm. When the nozzle is so positioned, the end 48 will move away from switch 52 and there will be no further movement of the spike 9 by motor 45. In the event the pressure $P_1$ decreases, the corresponding decrease in $P_1/P_0$ and $P_x$ will cause diaphragm 27 to move opening 34 to the right in nozzle 25 and such movement will cause end 49 to close switch 62 and energize motor 45 to move spike 9 rearwardly in a direction to increase the inlet area. At the same time, the follow-up linkage will move nozzle 25 until the pressure $P_x$ sensed by opening 34 is reduced to a value that balances pressure $P_0$ and the inlet area will then correspond to the increased value called for by the schedule. Thereafter, end 49 will move away from switch 62 to deenergize motor 45 and the diaphragm 27 will assume its null position. It is understood that the functions of the nozzle 25 and opening 34 are the same as previously described in connection with the previous embodiment and that the nozzle is contoured in the same manner in order to schedule the diffuser inlet area with the ratio $P_1/P_0$.

While the desired schedule can be obtained by contouring the nozzle 25 of Figures 4 and 5, it is also possible to utilize a nozzle of given configuration and to modify the follow-up linkage to obtain any desired schedule. Such a modified follow-up linkage is illustrated in Figure 6 wherein arm 40 has one end connected to the diffuser spike while the other end is connected to arm 41' which is pivotally mounted on a projection 113 of casing 23 by pin 42'. The arm 41' carries a cam portion 114 having an opening 115 which is suitably contoured to obtain the desired schedule. An arm 116 is slidably mounted within projection 113 and has a cam roller 117 at one end which is positioned within opening 115. The other end of arm 116 is rigidly connected to a projection 118 on nozzle 25 so that movement of roller 117 by cam opening 115 will slide arm 116 back and forth in order to position nozzle 25. Thus, movement of the spike will be transmitted to the nozzle through a linkage of varying mechanical advantage and the change in lever ratio as a function of spike position is determined by the manner in which the countour changes the effective length of the lever arm provided by the cam portion between pin 42' and roller 117. By means of this variable linkage, the position of opening 34 with respect to the nozzle 25 can be varied with spike position to obtain the same scheduling of inlet area as results from the contouring of nozzle 25 since the position of the spike required to balance the pressure $P_x$ against pressure $P_0$ can be varied depending upon the manner in which the spike moves nozzle 25, which, in turn, depends upon the contour selected for the cam opening.

Figure 7:
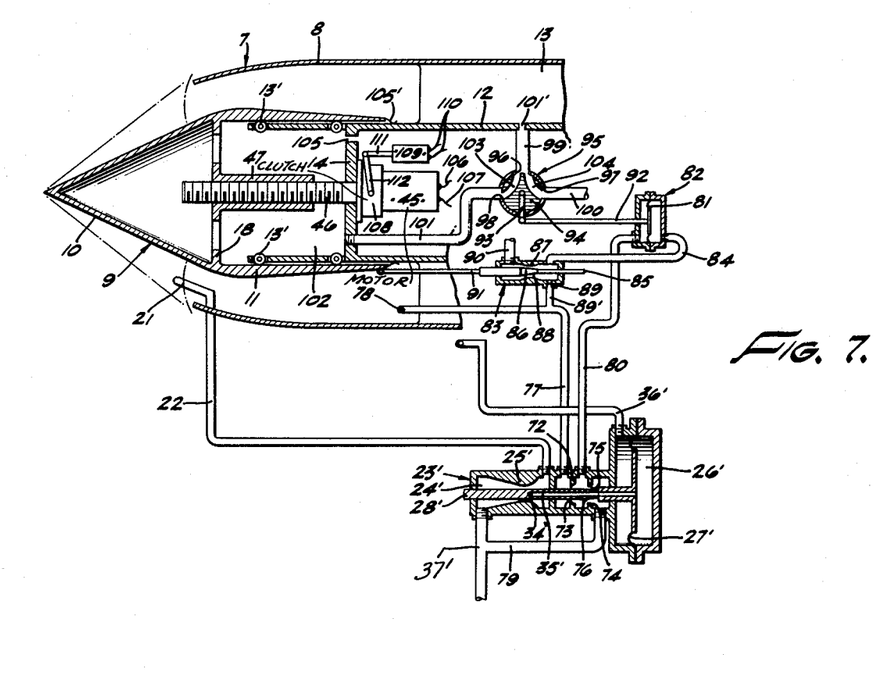
Figure 7 is a diagrammatic view of the wholly pneumatic form of the invention wherein the control pressures regulate a pneumatic pressure supply taken from the diffuser in order to position the diffuser spike.

The pneumatic form of the invention is illustrated in Figure 7 wherein like reference numerals designate like parts. The diffuser spike 9 has a conical nose section 10 and a circular base portion 11 which is supported by rollers 13' carried by one end of circular member 12. The partition 14 of member 12 supports an electric motor 45 which drives a ball screw jack 46 threaded through extension 47 of partition 13. Static pressure probe 21 is positioned at the lip of the diffuser and supplies the static pressure $(P_1)$ at the diffuser lip to the passage 22. The ratiometer device utilized in this modification is formed of a casing 23' having a cavity 24' in which is located a fixed converging-diverging nozzle 25', and the casing also has a cavity 26' within which is supported diaphragm 27'. A pick-up member 28' is located centrally of casing 23' and has one end slidably supported in an opening in the casing while the other end is rigidly secured to the diaphragm 27' for movement therewith. The portion of member 28' within nozzle 25' has a pressure pick-up opening 34' which is connected to one side of diaphragm 27' by a central passage 35' and the opposite side of the diaphragm is connected to free stream static pressure $(P_0)$ through passage 36'.

Intermediate the cavities 24' and 26', the casing forms a pressure divider device such as is disclosed in U.S. Patent No. 2,645,240 granted July 14, 1953 to John A. Drake and its reissue Re. 24,410. A section 72 of the casing forms a fixed area orifice 73 and section 74 forms a variable area orifice 75 in cooperation with the contoured section 76 of member 28'. A passage 77 connects the fixed area orifice 73 with probe 78 which senses the total pressure $(P_2)$ behind the diffuser inlet while a passage 79 connects the discharge side of the variable area orifice 75 to pressure $P_0$. The pressure in the space between the two orifices is led to passage 80 which connects to one side of a diaphragm 81 supported for movement by a casing 82.

The passage 22 connects pressure $(P_1)$ with cavity 24' at a position ahead of the nozzle and the nozzle exhaust to pressure $P_0$ through passage 37'. Since the opening 34' senses a fraction of pressure $P_x$ which is determined by its location within the nozzle, the diaphragm 27' will move until the opening 34' senses pressure $P_x$ which will balance the pressure $P_0$ and thereafter the diaphragm will remain in this position. If the pressure $P_1$ changes, the diaphragm and opening 34' will move to a new location to again balance the forces on the diaphragm. This movement of pick-up member 28' will vary the area of orifice 75 in accordance with the value of $P_1/P_0$ since the position of member 28' is determined by this ratio. Also, since pressure $P_2$ is sufficient to cause sonic velocity flow at the throats of orifices 73 and 75, the pressure sensed by passage 80 will be a fraction of pressure $P_2$ as determined by the ratio of the area of the fixed and variable orifices which ratio, in turn, is determined by the ratio $P_1/P_0$ and the position of member 28'. Thus, the pressure in passage 80 will vary with the ratio $P_1/P_0$. It is understood that the cavities 24' and 26' are sealed from the intermediate cavity which contains the orifices 73 and 75 since the casing for cavity 26' and the partitions defining cavity 24' are sealed around the pick-up member 28'.

The other side of diaphragm 81 opposite passage 80 connects with a casing 83 through passage 84. This casing slidably supports a rod 85 which has a contoured section 86 movable within a restriction 87 to form a variable area orifice 88. A fixed area orifice 89 in casing 83 is connected to pressure ($P_2$) by line 89' and the variable area of orifice 88 exhausts through line 90 to pressure $P_0$. The orifices 88 and 89 form a second pressure divider in which the pressure sensed by passage 84 is determined by pressure $P_2$ and the ratio of the areas of the orifice. An extension 91 of rod 85 connects with base portion 11 of spike 9 in order to provide a follow-up action which operates to change the area of orifice 88 until the pressures in lines 80 and 84 balance each other on diaphragm 81.

A rod 92 connects diaphragm 81 with a lever 93 secured to valve body 94 rotatable within a casing 95. This casing has three openings 96, 97 and 98 which connect with passages 99, 100 and 101, respectively. The passage 99 leads to a static pressure opening 101' to receive the static pressure ($P_s$) behind the diffuser, the passage 100 exhausts to pressure $P_0$ and the passage 101 leads to the interior space 102 of spike 9 through an opening in partition 14. The valve body 94 has two passages 103 and 104, the first of which serves in cooperation with openings 96 and 98 to control the airflow from passage 99 to passage 101 and the second of which serves in cooperation with openings 96 and 97 to control the airflow from passage 99 to passage 100. The partition 14 has a second opening 105 which connects space 102 to pressure $P_0$ so that continuous airflow can take place through the interior of the space 102. Thus, it is apparent that the position of valve body 94 will control the amount of air entering space 102 and that the pressure built up in space 102 will depend upon the ratio of the amount of air entering the space 102 to the amount of air leaving through fixed opening 105. Since the valve body 94 will be moved until the pressure in line 80 is balanced by the pressure in line 84, the spike 9 will assume a new position for each value of $P_1/P_0$ in order to balance the pressures on diaphragm 81, and therefore the inlet area of the diffuser can be scheduled with the ratio $P_1/P_0$. A seal 105' is affixed to base portion 11 and bears against member 12 to prevent air leakage from space 102.

It is understood that the pressure in space 102 continually acts against the external pressure on spike 9 resulting from the forward flight of the mounting craft and that for any given ratio of $P_1/P_0$, the valve body 94 will be positioned to just balance this external pressure. In order to permit movement of the diffuser spike, the screw 46 will be permitted to run free and will be driven by the diffuser spike. The motor 45 has leads 106 and 107 for selectively operating the motor 45 in reverse directions through clutch 108 when it is desired to override the control system. The clutch is normally disengaged, but when it is desired to drive screw 56 by the motor, the solenoid 109 is energized through leads 110 in order to engage the clutch by moving linkage 111, 112.

Referring to the operation of the pneumatic form of control system, an increase in pressure $P_1$ at probe 21 will result in an increase in $P_x$ and in the ratio $P_1/P_0$ which in turn will result in a decrease in the pressure in line 80. The diaphragm 81 will rotate valve body 94 in a clockwise direction (as seen in Figure 7) in order to increase the pressure in space 102 and move the spike 9 in a direction to decrease the diffuser inlet area. The movement of spike 9 will adjust the area of variable orifice 88 until the pressure in line 84 balances the pressure in line 80 and the valve body will seek a position whereby the external pressure on spike 9 will remain balanced when the spike is in its new position called for by the schedule of inlet area vs. $P_1/P_0$. In the event the pressure ($P_1$) decreases, the corresponding decrease in $P_1/P_0$ and $P_x$ will result in an increase in the pressure in line 80 and the diaphragm 81 will rotate valve body 94 in the counterclockwise direction in order to decrease the pressure in space 102 and move the spike 9 in a direction to increase the diffuser inlet area. The spike will move to a position where the pressures on diaphragm 81 become balanced and valve body 94 will seek a position whereby the pressure in space 102 balances the external pressure on spike 9 in its new position. Since at subsonic flight speeds, the pressure required to balance the spike 9 is equal to or below atmospheric ($P_0$), the control system will become inoperative at such speeds and under such condition, the spike is moved by motor 45 to fully open position, and locked in this position by continued engagement of clutch 108. However, at supersonic speeds the control system will operate automatically and vary the diffuser inlet area in accordance with the selected schedule as determined by the contour of nozzle 25'.

Three modifications of the invention have been described in which the ratio of $P_1/P_0$ is utilized to schedule diffuser inlet area. While three types of servo systems have been illustrated, any well known servo system could be utilized, and, of course, the dynamic response of these systems can be modified in any desired manner. Also, the schedule curve of diffuser inlet area vs. $P_1/P_0$ chosen for illustration represents only one example since the shape of the curve can be modified in the regions of both subsonic and supersonic flight to give the desired type of control for the engine equipped with the control system and, of course, the contour of the ratiometer nozzle can be varied to meet any selected schedule. The invention relates generally to the use of a static pressure probe at the diffuser lip to obtain a control pressure against which the diffuser inlet area can be scheduled, and to the provision for a schedule which will maintain normal shock at the diffuser lip. Various other modifications of the invention are contemplated by those skilled in the art without departing from the spirit and scope of the invention as hereinafter defined by the appended claims.

What is claimed is:

1. A control system for varying the inlet area of a diffuser in accordance with a pressure ratio comprising movable means for varying the inlet area of said diffuser, a lip at the entrance of said diffuser, means for sensing a single static pressure at the diffuser lip, means for sensing the free stream static pressure, control means connected to both said sensing means and movable solely in response to changes in the ratio of said diffuser lip static pressure to said free stream static pressure, and power means responsive solely to said control means for moving said movable means until the inlet area corresponds to that called for by the change in said ratio in order to maintain a selected relationship between inlet area and said ratio.

2. A control system as defined in claim 1 wherein said control means comprises means for producing a pressure which is a fraction of said diffuser lip static pressure, a diaphragm receiving said fraction of the diffuser lip static pressure on one side and free stream static pressure on the other, and means movable in response to a differential pressure on said diaphragm to energize said power means.

3. A control system as defined in claim 1 wherein said power means comprises an air valve for supplying a fluid pressure to said movable means and diaphragm means responsive to said control means for moving said valve to control the position of said movable means by varying said fluid pressure.

4. A control system for a diffuser having a diffuser lip at the entrance thereof comprising movable means for varying the inlet area of said diffuser, means connected separately with the static pressure at the diffuser lip and with free stream static pressure for continually sensing the ratio of said two pressures, and power means responsive solely to said ratio sensed by said sensing means for moving said movable means and adjusting said inlet area in accordance with a selected relationship of inlet area with said ratio.

5. A control system as defined in claim 4 wherein said sensing means comprises a diaphragm for receiving said free stream static pressure on one side thereof, a nozzle for receiving said diffuser lip static pressure, a pressure pick-up member positioned within said nozzle and connected with said diaphragm for movement therewith, said pick-up member having a pick-up opening connected with the other side of said diaphragm to transmit a pressure thereto which is a fraction of said diffuser lip static pressure as determined by the location of said opening in said nozzle, means responsive to the position of said pick-up member for actuating said power means, and follow-up means connected with said movable means for positioning said movable means in accordance with said selected relationship, said follow-up means comprising means for connecting said nozzle to said movable means for movement relative to said opening until said movable means is positioned in accordance with said relationship, said nozzle being contoured along its length to determine a value of inlet area for each value of said ratio.

6. A control system as defined in claim 5 wherein said follow-up means comprises means movable with said movable means to provide a first pressure proportional to the position of said movable means, said actuating means comprising means movable with said pick-up member to provide a second pressure proportional to said ratio, and control means responsive to the difference of said first and second pressures for actuating said power means and for positioning said movable means to balance said pressures, said nozzle being contoured along its length to determine a value of inlet area for each value of said ratio.

7. A control system as defined in claim 6 wherein said power means is comprised of a pressure source, a valve means operated by said control means to control said pressure source, said valve means connecting said pressure source to the interior of said movable means in order to position and hold said movable means against external forces.

8. A control system for a variable area supersonic diffuser having a cowling with a diffuser lip at the entrance thereof comprising movable spike means located within said cowling for varying the inlet area of said diffuser and means connected to said movable means for varying the inlet area in accordance solely with the ratio of a single static pressure at the diffuser lip to free stream static pressure, the selected relationship between said pressure ratio and inlet area being such that normal shock will be positioned at the diffuser lip to provide continuous critical operation of the diffuser during supersonic flight.

9. A control system for a variable area supersonic diffuser having a diffuser lip at the entrance thereof comprising movable means for varying the inlet area of said diffuser, and means connected to said movable means for varying the inlet area in accordance solely with the ratio of a single static pressure at the diffuser lip to free stream static pressure, said varying means comprising means responsive to said single static pressure and to said free stream static pressure for sensing said ratio and means responsive to said sensing means for positioning said movable means, the selected relationship between said pressure ratio and inlet area being such that the inlet area is a function of flight speed at Mach numbers below which normal shock attaches to the movable means and is an arbitrary function of said ratio which will maintain normal shock at the diffuser lip during flight at Mach numbers where the normal shock attaches to said movable means.

10. A control system for a variable area supersonic diffuser having a diffuser lip at the entrance thereof, comprising movable means for varying the inlet area of said diffuser, means for detecting the static pressure at the diffuser lip, means for detecting the free stream static pressure, means connected with both said detecting means for continually sensing the ratio of static pressure at the diffuser lip to free stream static pressure, said sensing means comprising a convergent-divergent nozzle for receiving the diffuser lip static pressure and connected to said movable means for movement therewith, a pressure pick-up member having a pick-up opening located within said nozzle, means responsive to the ratio of said pressures for positioning said opening along said nozzle, and means responsive to the position of said pick-up opening for moving said movable means, said nozzles being contoured so that the position of said nozzle relative to said opening required for the opening to sense a pressure equal to free stream static pressure varies with diffuser lip static pressure in accordance with a preselected relationship.

11. A control system as defined in claim 10 wherein said positioning means positions said opening along the entrance portion of the nozzle when the nozzle has subsonic velocity flow at the throat and positions said opening along the exit portion of the nozzle when the nozzle has sonic velocity flow at the throat so that the fraction of diffuser lip static pressure measured by said opening will decrease as the opening is positioned rearwardly along the nozzle.

12. A control system for a variable area supersonic diffuser having a diffuser lip at the entrance thereof comprising movable means for varying the inlet area of said diffuser, means for continually sensing the ratio of static pressure at the diffuser lip to free stream static pressure, said sensing means comprising a convergent-divergent nozzle connected with the diffuser lip static pressure, a pressure pick-up opening movable within said nozzle, means responsive to the pressure sensed by said opening and to free stream static pressure for positioning said opening along said nozzle in accordance with said ratio, said nozzle having a contour along its length such that the position of said opening within said nozzle at which said opening senses a pressure equal to free stream static pressure varies with diffuser lip static pressure in accordance with a preselected relationship and means responsive to the position of said opening along said nozzle for positioning said movable means.

13. A control system for a variable area supersonic diffuser, comprising movable means for varying the inlet area of said diffuser, means for continually sensing the ratio of static pressure at the diffuser lip to free stream static pressure, said sensing means comprising a convergent-divergent nozzle for receiving the diffuser lip static pressure and connected for movement by said movable means through a follow-up linkage, a pressure pickup opening located within said nozzle, means responsive to the pressure at said opening and to free stream static pressure for positioning said opening along the axis of said nozzle in accordance with said ratio, said follow-up positioning said nozzle so that the position of said nozzle relative to said opening required for the opening to sense a pressure equal to freestream static pressure varies with diffuser lip static pressure in accordance with a preselected relationship and means responsive to the position of said opening relative to said nozzle for positioning said movable means in accordance with a selected relationship between the inlet area and said pressure ratio.

14. A control system for a diffuser having a diffuser lip comprising movable means for varying the inlet area of said diffuser, means for sensing the static pressure at the diffuser lip, means for sensing the free stream static pressure, means responsive only to both said pressures for moving a control element in response to changes in the ratio of said diffuser lip static pressure to said free stream static pressure, and means responsive to movement of said control element for moving said movable means to adjust said inlet area in accordance with a selected relationship of inlet area to said pressure ratio.

References Cited in the file of this patent

UNITED STATES PATENTS

| | | |
|---|---|---|
| 1,934,982 | Jones | Nov. 14, 1933 |
| 2,540,594 | Price | Feb. 6, 1951 |
| 2,551,470 | Smith | May 1, 1951 |
| 2,575,085 | Alyea | Nov. 13, 1951 |
| 2,632,295 | Price | Mar. 24, 1953 |
| 2,632,456 | Breedlove | Mar. 24, 1953 |
| 2,638,738 | Salter | May 19, 1953 |
| 2,645,240 | Drake | July 14, 1953 |
| 2,675,670 | Tenney | Apr. 20, 1954 |
| 2,677,232 | Collins | May 4, 1954 |
| 2,737,015 | Wright | Mar. 6, 1956 |
| 2,817,209 | Besserer | Dec. 24, 1957 |
| 2,864,393 | Drake | Dec. 16, 1958 |